United States Patent
Desbiolles et al.

(10) Patent No.: US 6,741,048 B2
(45) Date of Patent: May 25, 2004

(54) PULSE-CONTROLLED ELECTRONICALLY COMMUTATED MOTOR

(75) Inventors: Pascal Desbiolles, Thorens-Glieres (FR); Christophe Nicot, Quintal (FR); Achim Friz, Seynod (FR)

(73) Assignee: S.N.R. Roulements, Annecy Cedex (FR)

( * ) Notice: Subject to any disclaimer, the term of this patent is extended or adjusted under 35 U.S.C. 154(b) by 56 days.

(21) Appl. No.: 10/254,765

(22) Filed: Sep. 26, 2002

(65) Prior Publication Data

US 2003/0059212 A1 Mar. 27, 2003

(30) Foreign Application Priority Data

Sep. 26, 2001 (FR) .............................. 01 12380

(51) Int. Cl.⁷ ................................. H02P 6/00
(52) U.S. Cl. ..................... 318/254; 318/602; 318/721
(58) Field of Search ................. 318/138, 254, 318/439, 602, 605, 700, 720, 721, 722, 724

(56) References Cited

U.S. PATENT DOCUMENTS

| | | | |
|---|---|---|---|
| 4,223,261 A | * 9/1980 | White | 318/721 |
| 4,228,396 A | * 10/1980 | Palombo et al. | 324/163 |
| 4,599,561 A | * 7/1986 | Takahashi et al. | 324/207.12 |
| 4,864,300 A | * 9/1989 | Zaremba | 341/6 |
| 5,431,413 A | 7/1995 | Hajzler | |
| 5,530,331 A | * 6/1996 | Hanei | 318/592 |
| 5,774,068 A | 6/1998 | Seki | |
| 5,898,301 A | 4/1999 | La Croix et al. | |
| 5,955,878 A | 9/1999 | Peilloud et al. | |
| 6,175,109 B1 | * 1/2001 | Setbacken et al. | 250/231.13 |

FOREIGN PATENT DOCUMENTS

| | | |
|---|---|---|
| WO | WO 90/07220 | 6/1990 |
| WO | WO 97/47079 | 12/1997 |
| WO | WO 99/17082 | 4/1999 |
| WO | WO 00/62020 | 10/2000 |
| WO | WO 00/75673 A1 | 12/2000 |

\* cited by examiner

*Primary Examiner*—Bentsu Ro
(74) *Attorney, Agent, or Firm*—Arent Fox Kintner Plotkin & Kahn

(57) ABSTRACT

The invention relates to an electronically commutated motor (1) comprising P phases and N pairs of poles, in which a circular multipole encoder (12) is associated with the rotating ring (6a) of an anti-friction bearing (6), said encoder (12) comprising a main multipole track (12a) and a multipole commutation track (12b) comprising 2*P*N singularities (12b1–12b6) equidistributed angularly and a control device comprising a fixed sensor (15) capable of delivering square digital signals A, B in quadrature and a digital signal C in the form of 2*P*N pulses per revolution of the encoder (12), a circuit for commutating (20) the currents in the phase windings of the motor (1) and a control circuit (21) for the commutation circuit (20).

11 Claims, 4 Drawing Sheets

PULSE-CONTROLLED ELECTRONICALLY COMMUTATED MOTOR

The invention relates to an electronically commutated motor comprising P phases and N pairs of poles.

On account of their high specific power, electronically commutated motors, or brushless motors, can be used to control the rotation of a mechanical member in a large number of applications.

One particular example of such an application relates to electric power-assisted steering systems in which an electronically commutated motor can be integrated so as to allow the application of an assist torque for the angular displacement of the wheels of a vehicle.

In a variant, and in the case of a "steer by wire" type decoupled steering system in which there is no direct mechanical link between the steering wheel and the wheels of the vehicle but only an electrical connection, an electronically commutated motor can be disposed under the steering wheel so as to reconstruct the steering force at the steering wheel. In a variant, a motor can be integrated, possibly in addition to the one mentioned above, so as to provide the angular displacement of the wheels of the vehicle.

Within the scope of its application, it is necessary to control precisely the commutation of the current in the phases of these motors in order to obtain a torque which is optimum and equal to a set point with the fewest modulations possible.

To do this, use is known of a sensor comprising three sensing elements disposed opposite an encoder having N pairs of poles, said encoder being rotated by the motor.

In the case of a three-phase motor, by answering that the three sensing elements are phase-displaced with respect to one another by a mechanical angle making it possible to supply three electrical signals phase-displaced by 120 electrical degrees, it is possible to control the commutation between the phases of the motor at the right moment.

But this type of implementation can cause modulations of the motor torque which are due in particular to:
  the reluctance torque of the motor;
  faults of commutation of the current from one phase to another depending on the speed of rotation of the motor;
  the absence of overlapping of the trapezoidal EMFs.

There is known, in particular from the document FR-2 749 452, a device for controlling an electronically commutated electric motor which makes it possible to partially avoid the torque faults related to the commutation of the current from one phase to another.

But, in order to avoid the torque modulation related to the motor design (reluctance torque and absence of overlapping of the trapezoidal EMFs), it then becomes necessary to know to a fine degree the absolute position of the rotor in order to control the current in the phases according to the position of the rotor.

Such a control strategy therefore necessitates an additional sensor giving a high-resolution position in addition to the one controlling the commutation.

This type of solution, providing two sensors, leads to significant integration constraints and a non-optimised cost. Moreover, it can be penalising in terms of mechanical inertia of the rotor.

The invention aims in particular to resolve these drawbacks by proposing an electronically commutated motor in which one of the anti-friction bearings allowing the rotation of the rotor carries a two-track encoder which is movable rotation-wise in front of a single sensor fixed rotation-wise, said sensor being capable, after processing by a control device, of delivering on the one hand signals for commutating the current in the phases and on the other hand high-resolution position signals for allowing the control of the current supplying the phases, with a sufficiently fine resolution to avoid motor torque modulations.

Moreover, the motor according to the invention requires only a small amount of mechanical modification compared with conventional motors, while integrating a device for controlling the commutation of the current between the phases of the motor which is effective.

To that end, the invention proposes an electronically commutated motor comprising P phases and N pairs of poles, said motor comprising:
  a rotor having the N pairs of poles and a stator having P coils formed respectively from a phase winding, said rotor being mounted able to rotate inside the stator by means of at least one anti-friction bearing, said anti-friction bearing comprising a fixed ring, a rotating ring associated with the rotor and rolling bodies disposed between said rings; and
  a device for controlling the commutation of the current between the phases of the motor;
said motor also comprising:
  a circular multipole encoder associated with the rotating ring of an anti-friction bearing, said encoder comprising a main multipole track and a multipole commutation track comprising 2*P*N singularities equidistributed angularly, the main and commutation tracks being concentric on the encoder; and
  a control device comprising:
    a fixed sensor disposed opposite and at air gap distance from the encoder, said sensor comprising at least three sensing elements, at least two of which are positioned opposite the main track so as to deliver square digital signals A, B in quadrature, and at least one of which is positioned opposite the commutation track so as to deliver a signal C in the form of 2*P*N pulses per revolution of the encoder;
    a circuit for commutating the currents in the phase windings of the motor having 2*P*N switches;
    a control circuit for the commutation circuit which:
      from the signal C supplies commutation signals for the switches; and
      from the signals A, B and according to a first current set point defines a second current set point which controls the current supplying the phase windings of the motor.

Other objects and advantages of the invention will emerge during the description which follows, given with reference to the accompanying drawings, in which.

The invention relates to an electronically commutated motor 1 or brushless motor comprising P phases.

This type of motor typically comprises a rotor 2 having N pairs of North/South magnetic poles and a stator 3 having P coils formed respectively from a phase winding, the rotor 2 being rotated in a known manner by controlling the electrical supply in the P phase windings.

Figure 4:
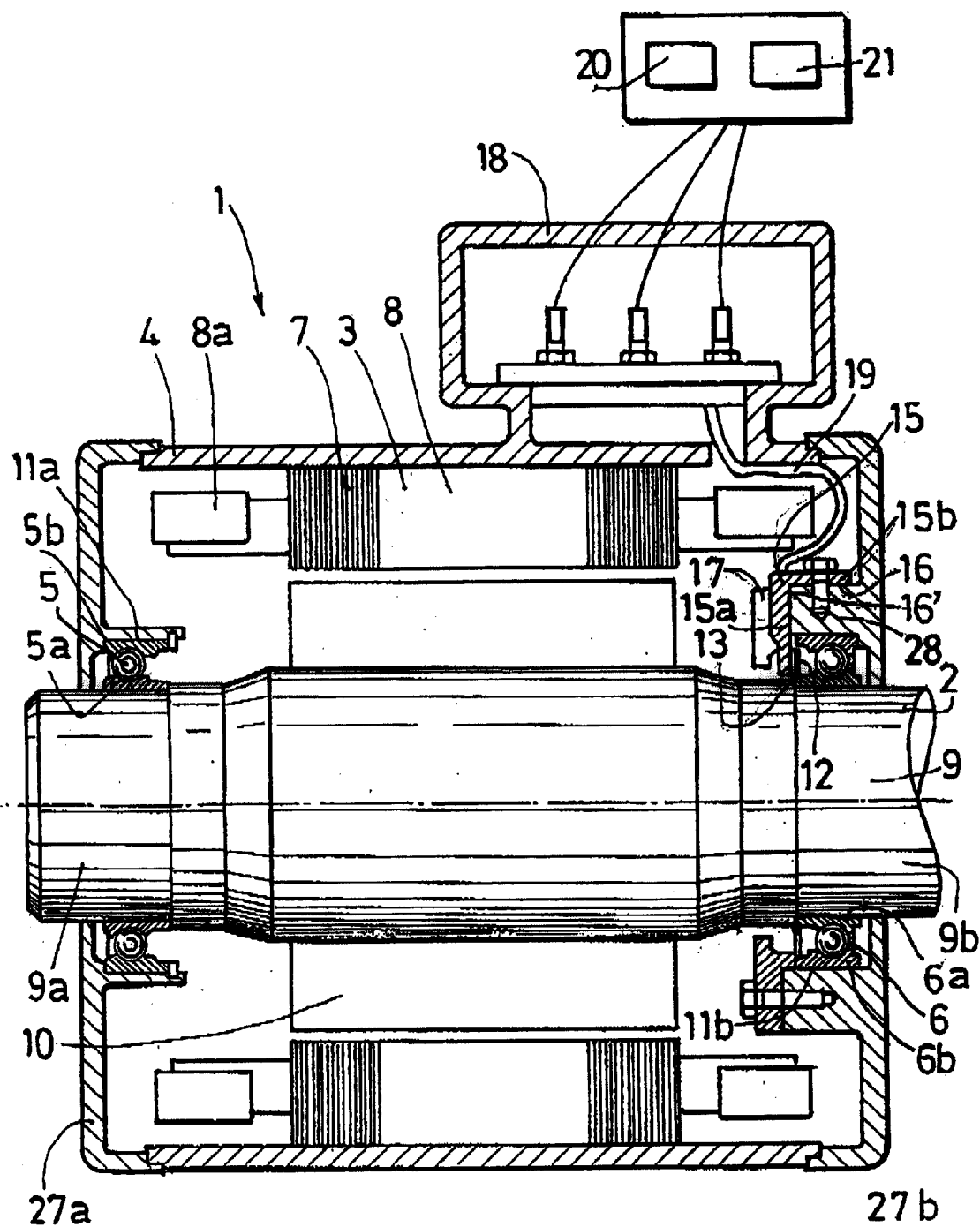
FIG. 4 is a view in longitudinal cross-section of an electronically commutated motor according to the invention.

In the embodiment depicted in FIG. 4, the motor 1 comprises a casing 4 in which on the one hand the stator 3 is housed in a fixed manner and on the other hand the rotor 2 is mounted able to rotate by means of two anti-friction bearings 5, 6.

The stator 3 comprises flux guide plates 7 on which the coils 8 are wound with, at each end of the stator 3, an end winding 8a.

The rotor 2, disposed inside the stator 3, comprises a shaft 9 on the central part of which there are disposed the magnets 10 forming the N pairs of magnetic poles.

On either side of the magnets 10, the rotating inner ring 5a, 6a of an anti-friction bearing 5, 6 is fitted respectively onto parts 9a and 9b of the shaft 9 so as to provide the rotation thereof. To that end, the outer rings 5b, 6b of the anti-friction bearings 5, 6 are disposed respectively in a housing 11a, 11b of an end shield 27a, 27b associated with the casing 4 in order to be fixed with respect thereto.

In the embodiment depicted in FIG. 4, an encoder 12 is associated with the inner ring 6a of an anti-friction bearing 6 in order to be driven rotationally thereby. To that end, the encoder 12 can be overmoulded on an annular frame 13 fitted on the inner ring 6a.

The encoder 12 comprises a main track 12a and a commutation track 12b comprising 2*P*N singularities 12b1–12b6 equidistributed angularly, the main track 12a and commutation track 12b being disposed concentrically on the encoder 12.

In one particular example, the encoder 12 is formed from a multipole magnetic ring on which there are magnetised a plurality of pairs of equidistributed North and South poles 14 with a constant angular width so as to form the main track 12a and commutation track 12b, a magnetic singularity 12b1–12b6 of the commutation track 12b being formed from two pairs of poles which are different from the others.

Figure 2:
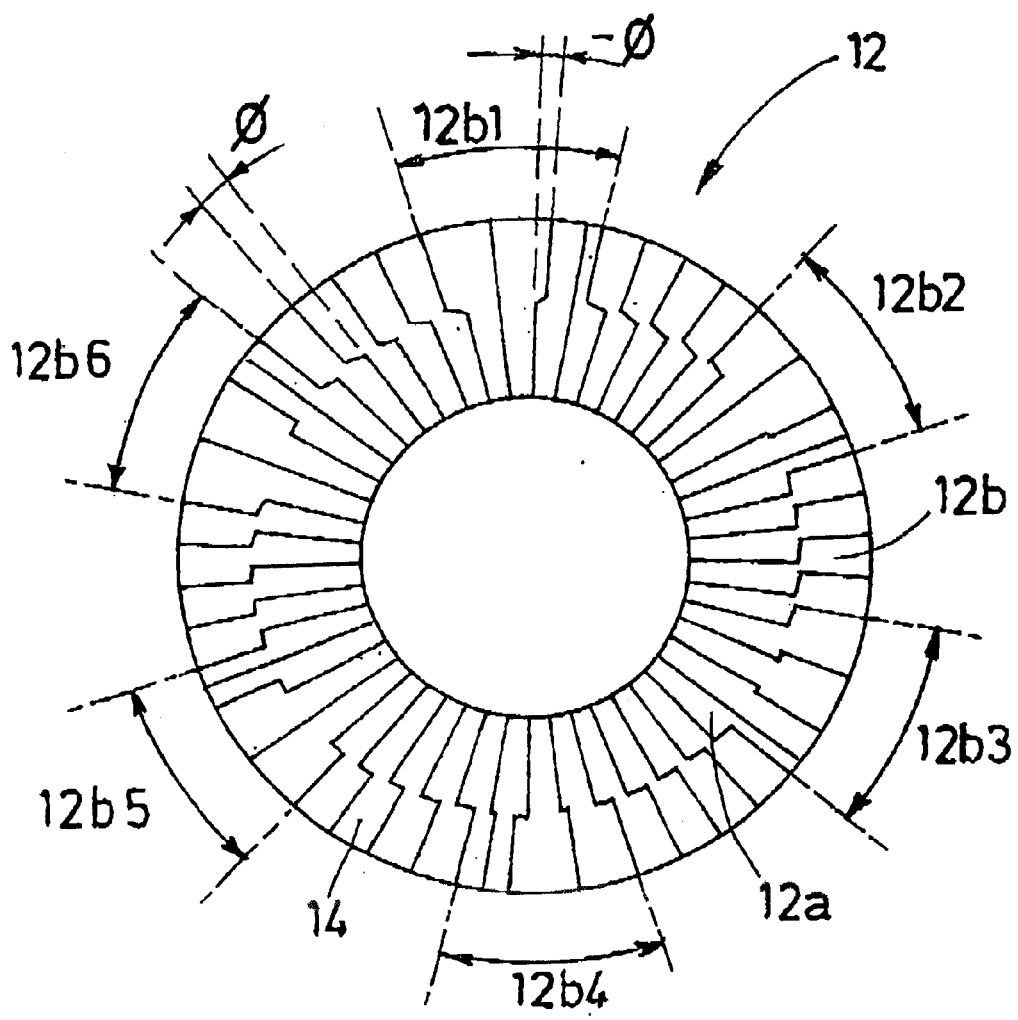
FIG. 2 is a schematic front view of an encoder usable in front of the sensor of the control device of FIG. 1.

In the particular embodiment depicted in FIG. 2, the main track 12a, disposed towards the inside of the ring, and commutation track 12b, disposed towards the outside of the ring, comprise 24 pairs of poles. The pairs of poles 14 of the commutation track 12b are in phase advance by a value φ, for example equal to one eighth of a period, compared with those of the main track 12a.

In this case where P=3 and N=1, the commutation track 12b comprises 6 magnetic singularities 12b1–12b6 spaced apart from one another by two pairs of poles. Each singularity is formed from two pairs of poles 14, the width of the poles being arranged so that they are respectively phase displaced by φ, 0, −φ and 0 with respect to the corresponding poles of the main track 12a. Thus, as will be seen subsequently, each pulse of the signal C corresponds to the detection of a phase displacement reversal between the main track 12a and the commutation track 12b.

The motor also comprises a device for controlling the commutation of the current between the phases of the motor.

Figure 1:
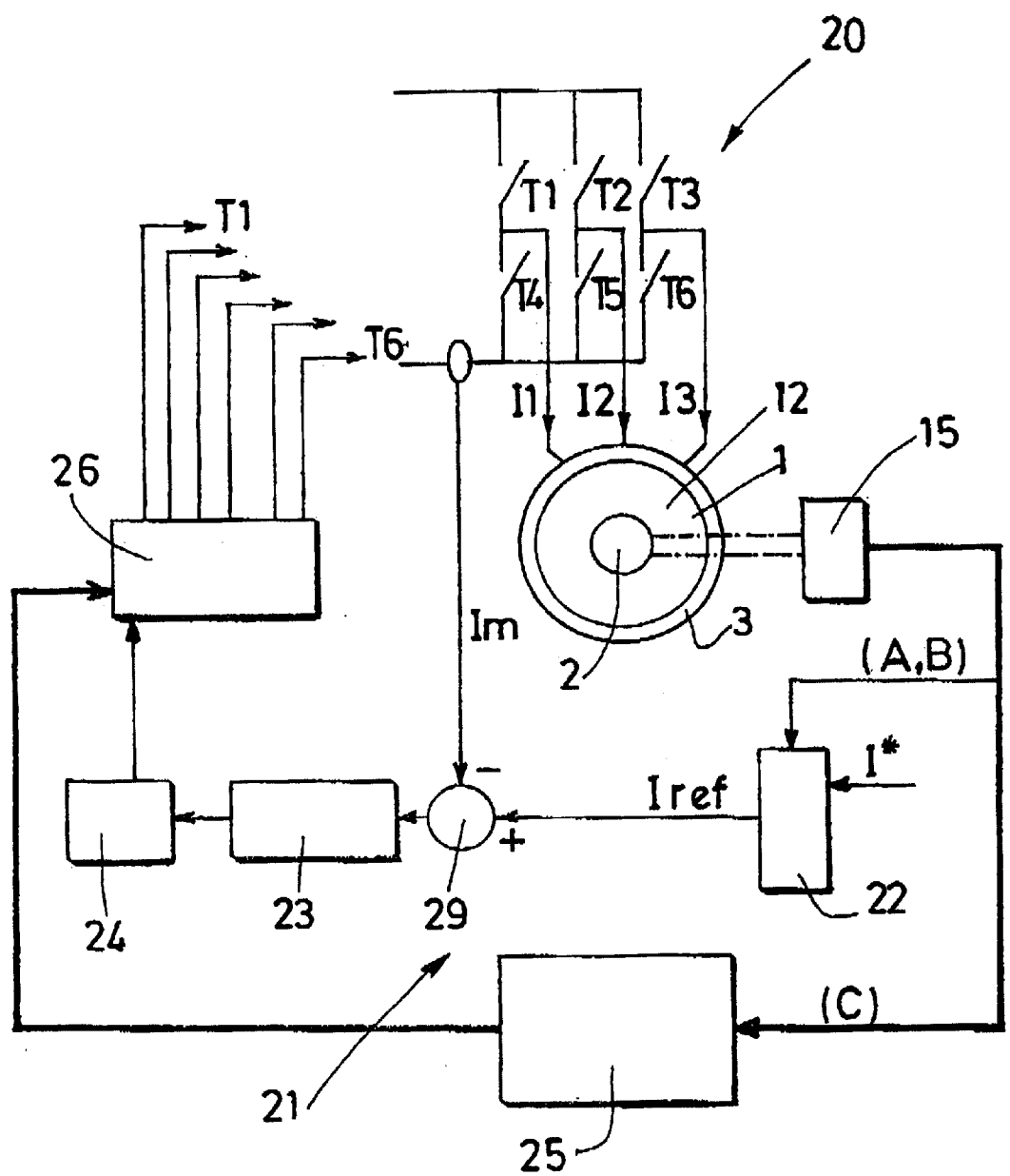
FIG. 1 is a block diagram of a device for controlling an electronically commutated motor comprising 3 phases and one pair of poles.

FIG. 1 depicts a block diagram of a device for controlling a motor 1 with three phases and one pair of poles.

The control device comprises a fixed sensor 15 disposed opposite and at air gap distance from the encoder 12.

The sensor 15 comprises at least three sensing elements, at least two of which are positioned opposite the main track 12a, and at least one of which is positioned opposite the commutation track 12b.

In one particular example, the sensing elements are chosen from amongst the group comprising Hall effect sensors, magnetoresistors and giant magnetoresistors.

The sensor 15 used is capable of delivering two periodic electrical signals S1, S2 in quadrature by means of the sensing elements disposed opposite the main track 12a and an electrical signal S3 by means of the sensing elements disposed opposite the commutation track 12b.

The principle of obtaining the signals S1 and S2 from a plurality of aligned sensing elements is for example described in the document FR-2 792 403 originating from the applicant.

But sensors 15 comprising two sensing elements which are capable of delivering the signals S1 and S2 are also known.

Figure 3:
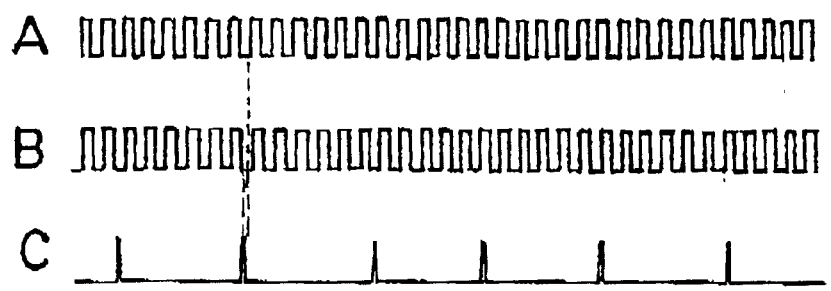
FIG. 3 depicts the signals A, B and C delivered by the sensor during rotation of the encoder depicted in FIG. 2.

The sensor 15 also comprises an electronic circuit which, from the signals S1, S2 and S3, delivers square digital signals A, B in quadrature and digital signal C in the form of 6 (P=3 and N=1) electrical pulses per revolution of the encoder 12 (see FIG. 3).

One principle of obtaining the digital signals A, B and C, as well as different embodiments of the magnetic singularities 12b1–12b6, are described in the documents FR-2 769 088 and EP-0 871 014.

By means of an adapted electronic processing of the signals A, B and C, it is possible to obtain to a fine degree the speed of rotation, the angular position and/or the direction of rotation of the encoder 12 with respect to the sensor 15, and therefore of the rotor 2 with respect to a fixed point.

According to one implementation, the sensor 15 also comprises an interpolator, for example of the type described in the document FR-2 754 063 originating from the applicant, making it possible to increase the resolution of the output signals.

The sensor 15 can be integrated on a substrate of silicon or equivalent, for example GaAs, so as to form an integrated circuit customised for a specific application, a circuit sometimes designated by the term ASIC for referring to an integrated circuit designed partially or completely according to requirements.

Although the description is given in connection with a magnetic encoder/sensor assembly, it is also possible to implement the invention in an analogous manner using optical technology. For example, the encoder 12 can be formed from a metal or glass target on which the reference and commutation tracks have been etched so as to form an optical pattern analogous to the multipole magnetic pattern described above, the sensing elements then being formed from optical detectors.

Figure 6:
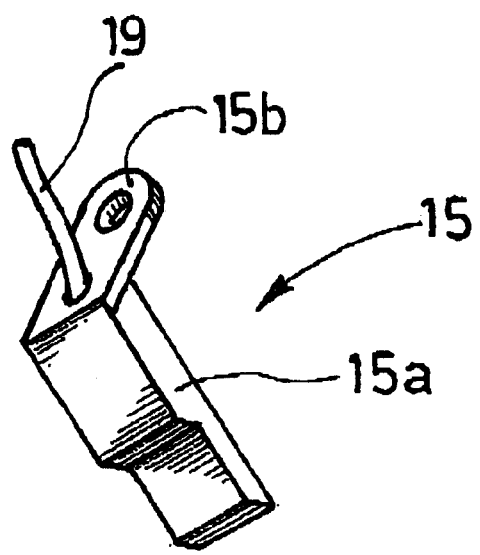
FIG. 6 is a perspective view of the sensor of FIG. 4.

In the embodiment depicted in FIG. 6, the sensor 15 comprises on the one hand a moulded plastic body 15a in which the sensing elements or the ASIC are integrated and on the other hand a metal insert 15b allowing the association by means of a screw 28 of the sensor 15 on a support surface 16 of the end shield 27.

This implementation, by resting the sensor 15 on the support surfaces 16, 16', makes it possible to provide the control of the positioning of the sensing elements opposite and at air gap distance from the encoder 12.

Figure 5:
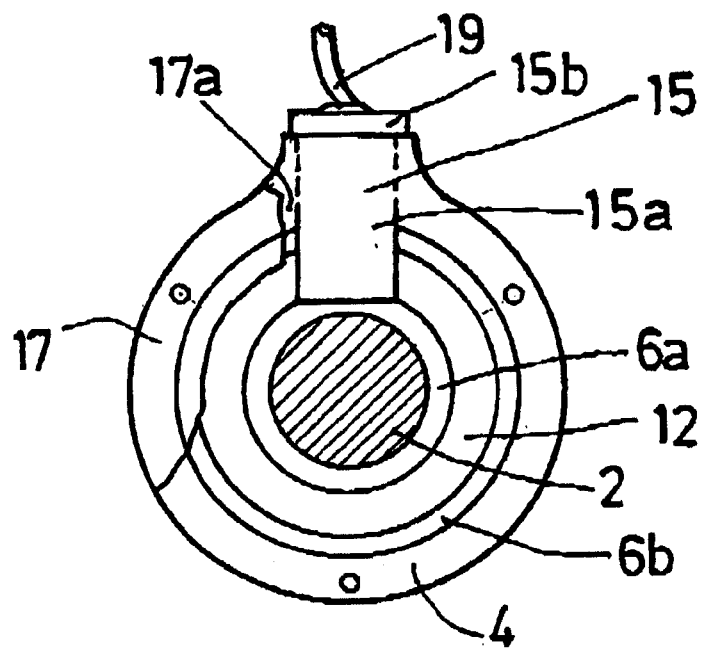
FIG. 5 is a front view of the disposition of the assembly formed by the anti-friction bearing having the encoder and the sensor, in the motor of FIG. 4.

Moreover (see FIG. 5), an end shield 17 (partially depicted) provided with an opening 17a so that the body 15a can be positioned facing the encoder 12 is clamped against the external face of the outer ring 6b by three screws distributed at 120° from one another in order to stop any axial displacement of the anti-friction bearing 6. Displacements of the sensor 15 with respect to the encoder 12 are prevented by the screw 28.

In a variant, provision can be made that the sensor 15 is associated with the fixed ring 6b of the anti-friction bearing 6 while providing the positioning of the sensing elements opposite and at air gap distance from the tracks of the encoder 12.

Other embodiments of the association of an encoder 12 and a sensor 15 on an anti-friction bearing 6 can be envisaged, in particular those described in the documents FR-2 794 504 and FR-2 700 588 originating from the applicant.

In order to provide the input/output interface for the various electrical signals, the casing 4 is provided with a terminal block 18 capable on the one hand of supplying the motor 1 with current and on the other hand of supplying, by means of a cable 19, the output signals A, B, C of the sensor 15 to the control device.

The control device also comprises a circuit for commutating 20 the currents in the phase windings of the motor 1.

The commutation circuit 20 comprises 2*P*N switches T1–T6, for example each formed from a MOSFET type field effect transistor operating at 20 kHz, which are disposed as a bridge so as to supply the phase windings appropriately.

The 2*P*N switches T1–T6 can be actuated in twos according to 2*P*N possible states, the transition from one state to another being controlled by the detection of one of the 2*P*N pulses of the signal C.

In the embodiment depicted in FIG. 1, the commutation device 20 comprises 6 switches T1–T6 which make it possible to supply the three phase windings with respectively a current I1, I2 and I3, I1+I2+I3 being equal to 0.

The control of the commutation device 20, that is to say the selective actuation of the switches T1–T6, is performed by a control circuit 21 which:

from the signal C supplies commutation signals for the plurality of switches T1–T6; and from the signals A, B and according to a first current set point I* defines a second current set point Iref which controls the current Im supplying the phase windings of the motor 1.

The current set point I* can originate for example from a control loop for the speed of the rotor 2, a control loop for the position of the rotor 2 or a measurement of the torque having to be applied by the rotor 2 on the mechanical member.

The set point I* is supplied to an electronic circuit 22 which, from this set point, introduces a modulation of the set point Iref according to the position of the rotor originating from the signals A and B, this modulation having an amplitude which is a function of I* and being in phase opposition with respect to the intrinsic torque modulation at the motor 1, in order to obtain a useful torque of the motor 1 free from modulation.

In the embodiment depicted, the control circuit 21 comprises a regulation loop comprising a regulator 23, for example of PID (proportional integral derivative) type, a variable width control (PWM) 24 supplying a 20 kHz square signal, the duty factor of which is controlled by the regulator 23, and a comparator 29 comparing Im with Iref originating from the electronic circuit 22.

In a known manner, the regulation loop makes it possible, from Iref, to modulate the current in the phase windings according to the position of the rotor 2 so as to obtain a motor torque constantly equal to the set point I*.

The control circuit 23 can be implemented in the form of a single microprocessor 25 integrating at least one commutation logic for the commutation circuit 20 which determines the sequence of the openings/closings of the different switches T1–T6. In one particular example, the commutation logic can be different according to the direction of rotation of the rotor 2.

In a variant, the regulation loop can be implemented in analogue form.

According to one implementation, the control circuit 21, by comparing the current Im supplying the motor with the current set point Iref, makes it possible to modulate the commutation signals in terms of width and duration by means of an AND logic function 26.

Thus, each time one of the 2*P*N pulses of the signal C is detected, two switches, according to the state of the commutation logic, are selectively closed so as to supply the corresponding two phase windings with the regulated current Im.

The phase commutation instants can be provided upon the detection of the rising or falling edge of the pulse. In a variant, and in order to improve the accuracy of the commutation, provision can be made that the rising edge is used in one direction of rotation and the falling edge in the other direction.

The operation of the motor is as follows:

the motor 1 is supplied by a current Im so as to allow the rotor 2, and therefore the associated encoder 12, to be rotated;

the sensor 15 delivers the signals A, B representing in particular the position of the rotor 2 and the signal C in the form of 6 pulses per revolution;

each time a pulse is detected, the microprocessor 25 selectively closes two switches T1–T6 according to the selected commutation logic;

the signals A, B, representing in particular the position of the rotor 2, make it possible, according to the first current set point I* and by means of the control circuit 21, to control the current Im supplying the motor 1 so as to limit the modulations thereof.

In one particular example, the commutation logic is implemented so that the rotor field is phase displaced from the stator field by an angle between 60° and 120° so as to optimise the torque supplied by the motor 1.

What is claimed is:

1. An electronically commutated motor (1) comprising P phases and N pairs of poles, said motor comprising:

a rotor (2) having the N pairs of poles and a stator (3) having P coils formed respectively from a phase winding, said rotor (2) being mounted able to rotate inside the stator (3) by means of at least one anti-friction bearing (5, 6), said anti-friction bearing (5, 6) comprising a fixed ring (5b, 6b) and a rotating ring (5a, 6a) associated with the rotor (2); and a device for controlling the commutation of the current between the phases of the motor (1);

said motor (1) being characterised in that:

a circular multipole encoder (12) is associated with the rotating ring (6a) of an anti-friction bearing (6), said encoder (12) comprising a main multipole track (12a) and a multipole commutation track (12b) comprising 2*P*N singularities (12b1–12b6) equidistributed angularly, the main (12a) and commutation (12b) tracks being concentric on the encoder (12); and the control device comprises:

a fixed sensor (15) disposed opposite and at air gap distance from the encoder (12), said sensor (15) comprising at least three sensing elements, at least two of which are positioned opposite the main track (12a) so as to deliver square digital signals A, B in quadrature, and at least one of which is positioned opposite the commutation track (12b) so as to deliver a signal C in the form of 2*P*N pulses per revolution of the encoder (12);

a circuit for commutating (20) the currents in the phase windings of the motor (1) having 2*P*N switches (T1–T6);

a control circuit (21) for the commutation circuit (20) which:

from the signal C supplies commutation signals for the switches (T1–T6); and from the signals A, B and according to a first current set point (I*) defines a second current set point (Iref) which controls the current (Im) supplying the phase windings of the motor (1).

2. A motor according to claim 1, characterised in that the sensor (15) is associated with the fixed ring (5b) of the anti-friction bearing (5) having the encoder (12).

3. A motor according to claim 2, characterised in that the control circuit (21) comprises a regulation loop controlled by the second current set point (Iref) originating from an electronic circuit (22), said control circuit (21) being capable of modulating the commutation signals in terms of width and duration by means of an AND logic function (26).

4. A motor according to any one of claims 1 to 3, characterised in that the control circuit (21) comprises a microprocessor (25) integrating at least one commutation logic for the commutation circuit (20).

5. A motor according to any one of claims 1 to 3, characterised in that the encoder (12) is formed from a multipole magnetic ring on which there are magnetised a plurality of pairs of equidistributed North and South poles (14) with a constant angular width so as to form the main track (12a) and commutation track (12b), a magnetic singularity (12b1–12b6) being formed from two pairs of poles which are different from the others.

6. A motor according to claim 5, characterised in that the sensing elements are chosen from amongst the group comprising Hall effect sensors, magnetoresistors and giant magnetoresistors.

7. A motor according to claim 6, characterised in that the sensor (15) comprises a plurality of aligned sensing elements which are disposed opposite and at air gap distance from the main track (12a).

8. A motor according to any one of claims 1 to 3, characterised in that the encoder (12) is formed from a target on which the reference (12a) and commutation (12b) tracks have been etched so as to form an optical pattern analogous to a multipole magnetic pattern, the sensing elements then being formed from optical detectors.

9. A motor according to claim 8, characterised in that the sensor (15) comprises a plurality of aligned sensing elements which are disposed opposite and at air gap distance from the main track (12a).

10. A motor according to claim 1, characterised in that the sensor (15) comprises an interpolator increasing the resolution of the output signals.

11. A motor according to claim 1, characterised in that the sensor (15) is integrated in an ASIC type circuit.

* * * * *